United States Patent [19]

Yoshida et al.

[11] Patent Number: 4,457,185
[45] Date of Patent: Jul. 3, 1984

[54] ROTATIONAL SPEED CONTROLLING DEVICE FOR AUTOMATIC TRANSMISSIONS USING SLIDING ENGAGEMENT PIECE

[75] Inventors: Hitoshi Yoshida, Kamimura; Seiichi Suzuki, Shizuoka, both of Japan

[73] Assignee: Suzuki Motor Company Limited, Japan

[21] Appl. No.: 288,176

[22] Filed: Jul. 29, 1981

[30] Foreign Application Priority Data

Aug. 8, 1980 [JP] Japan ................................ 55-108273
Oct. 28, 1980 [JP] Japan ................................ 55-151024

[51] Int. Cl.³ .............................................. F16H 5/52
[52] U.S. Cl. ................................. 74/336 R; 74/337; 192/54; 192/105 B; 192/105 CD; 192/48.3
[58] Field of Search ................ 74/330 R, 337, 336 B; 192/54, 48.3, 48.1, 105 B, 105 CD, 48.9, 70.23

[56] References Cited

U.S. PATENT DOCUMENTS

| | | | |
|---|---|---|---|
| 2,056,050 | 9/1936 | Harris | 192/48.9 |
| 2,172,991 | 9/1939 | Segard | 192/105 B |
| 2,432,077 | 2/1947 | Segard | 192/105 B |
| 2,721,639 | 10/1955 | Miller | 192/54 |
| 3,268,046 | 8/1966 | Hirano | 192/54 |
| 3,572,482 | 3/1971 | Kalpas et al. | 192/54 |

FOREIGN PATENT DOCUMENTS

| | | | |
|---|---|---|---|
| 831243 | 12/1937 | France | 192/105 CD |
| 1011867 | 7/1952 | France | 192/105 B |
| 1220036 | 5/1960 | France | 192/105 B |

*Primary Examiner*—Allan D. Herrmann
*Assistant Examiner*—D. Wright
*Attorney, Agent, or Firm*—McGlew and Tuttle

[57] ABSTRACT

A rotational speed number controlling device for automatic transmissions for changing speeds by automatically changing a plurality of centrifugal clutches in response to the number of revolutions of the engine wherein a sliding piece is connected to a rotary shaft to which the rotation of a low speed side centrifugal clutch is to be transmitted so as to be able to transmit rotations and to be slidable in the axial direction in response to the driving torque so that the number of engaging rotations of a high speed side centrifugal clutch may be varied by the sliding of the above mentioned sliding piece caused in response to the driving torque. For example, in the case of a quick acceleration at the time of the second speed running in an automatic three-speed transmission, the high speed side centrifugal clutch may not be immediately engaged but the second speed state may be maintained until a sufficient acceleration and then the high speed side centrifugal clutch may be engaged.

3 Claims, 3 Drawing Figures

ROTATIONAL SPEED CONTROLLING DEVICE FOR AUTOMATIC TRANSMISSIONS USING SLIDING ENGAGEMENT PIECE

FIELD AND BACKGROUND OF THE INVENTION

This invention relates to an automatic transmission rotational speed controlling device for the use on motor cycles or the like.

An automatic transmission wherein the speed is changed by automatically changing centrifugal clutches in response to the number of revolutions of the engine by using a plurality of centrifugal clutches is used on motor cycles or the like.

However, as the centrifugal clutches are disengaged and engaged in response to the number of rotations, even if the engine is to be quickly accelerated to quickly start, as the number of rotations at which the speed is changed is constant, only a constant acceleration will be obtained.

SUMMARY OF THE INVENTION

In view of this point, an object of the present invention is to provide a rotational speed controlling device for automatic transmissions on motor cycles or the like wherein, in case a quick acceleration is required of the engine, a centrifugal clutch on the low speed side will maintain the engagement until a high rotation so as to increase the driving torque with gears on the low speed side to make the quick acceleration possible.

In order to attain the above mentioned object, the controlling device for automatic transmissions according to the present invention is of a formation wherein a sliding piece is connected to a rotary shaft to which the rotation of a low speed side centrifugal clutch is to be transmitted so as to be able to transmit rotations and to be slidable in the axial direction in response to the driving torque so that the number of rotations at which a high speed side centrifugal clutch is engaged may be varied by the sliding of the above mentioned sliding piece caused in response to the driving torque.

That is to say, in the present invention, the low speed side centrifugal clutch and the rotary shaft to which the rotation of said clutch is to be transmitted are connected with each other through the sliding piece so that the rotation of the above mentioned clutch may be transmitted to the above mentioned rotary shaft through the sliding piece. The sliding piece may slide in the axial direction in response to the driving torque and the engaging rotation number of the high speed side centrifugal clutch may be varied by utilizing the sliding of this sliding piece.

BRIEF DESCRIPTION OF THE DRAWINGS

The present invention shall be explained in detail in the following with reference to the embodiments shown in the drawings in which.

DESCRIPTION OF THE PREFERRED EMBODIMENTS

Figure 1:
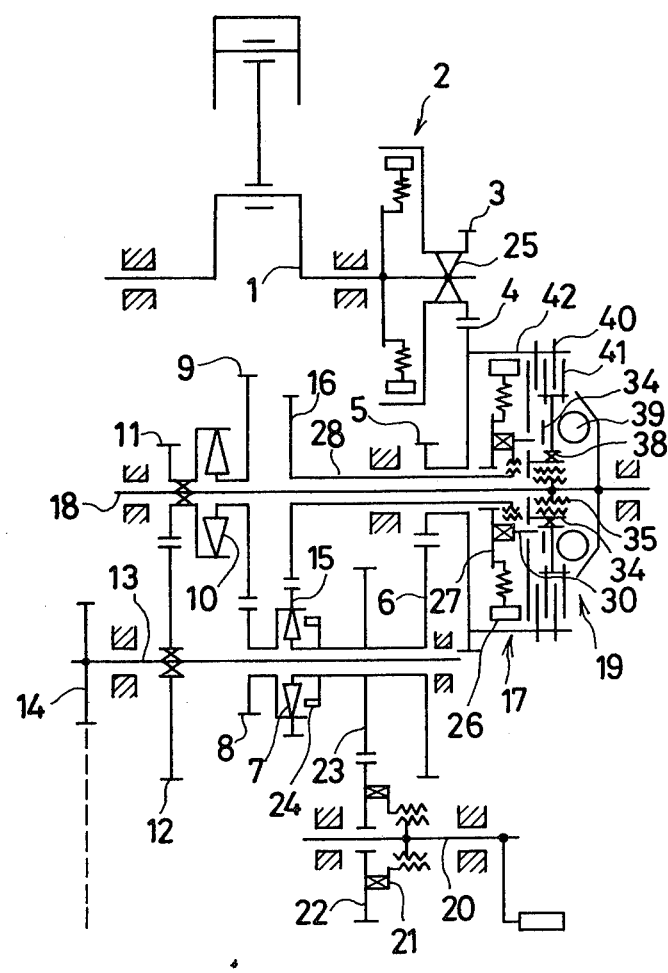
FIG. 1 is a schematic view showing an automatic transmission provided with an embodiment of the rotational speed controlling device according to the present invention.

FIG. 1 shows a type of automatic transmission wherein an intermediate shaft and output shaft are provided in parallel with each other near the crank shaft of an engine. A low centrifugal clutch for starting is arranged on the crank shaft and a second centrifugal clutch for a low speed side and third centrifugal clutch for a high speed side are arranged on the intermediate shaft so that the speed may be automatically changed in three steps. The rotation of the above mentioned output shaft is transmitted to the rear wheel axle (not illustrated) in the rear through a chain or the like. Further, the rotational speed controlling device is provided in the part of the above mentioned second centrifugal clutch for the low speed side and third centrifugal clutch for the high speed side.

In FIG. 1, the rotation of the input or crank shaft 1 of the engine is transmitted to a low pinion 5 and low gear 6 through a low centrifugal clutch 2 for starting of a type in which shoes expand, primary pinion 3 and primary gear 4. It is further transmitted to a one-way clutch 7, driven pinion 8, driven gear 9, one-way clutch 10, secondary pinion 11 and secondary gear 12 and to an output sprocket 14 from an output shaft 13.

When the rotational speed of the crank shaft 1 rises, the rotations of the second gear 15, second pinion 16 and second pinion shaft 28 rotating together with the driven pinion 8 will rise, a shoe expanding type second or low centrifugal clutch 17 provided on said shaft 28 will engage, a power transmitting system path will be switched from the primary gear 4 to the second centrifugal clutch 17, second pinion shaft 28, second pinion 16, second gear 15 and driven pinion 8 to increase the speed and the one-way clutch 7 will idle.

When the rotation further rises, the rotation of the intermediate shaft 18 rotating integrally with the secondary pinion 11 will rise, a centrifugal ball type third or high centrifugal clutch 19 will engage, the power transmitting system path will be switched from the primary gear 4 to the third centrifugal clutch 19, intermediate shaft 18 and secondary pinion 11 to further increase the speed. In this case, the one-way clutches 7 and 10 will idle.

When the crank shaft 1 is started, with the rotation of a kick shaft 20, a kick pinion 22 and kick gear 23 will be rotated through a dogtooth clutch 21, the one-way clutch 7 will be made ineffective by a pawl lowering piece 24 and the crank shaft 1 will be rotated through the low gear 6, low pinion 5, primary gear 4, primary pinion 3 and one-way clutch 25.

An embodiment of rotational speed controlling device according to the present invention provided in the part of the second centrifugal clutch 17 and third centrifugal clutch 19 of the above mentioned transmission shall be explained in the following with reference to FIG. 2.

In the illustrated controlling device, a hub 27 bearing the expanding shoes 26 of the second centrifugal clutch 17 is rotatably loosely fitted to the second pinion shaft 28 extended from the second pinion 16 and a sliding piece 30 is slidably fitted to the hub 27 through dogteeth 29 and is connected through a helical spline 31 to the second pinion shaft 28 which is a rotary shaft to which the rotation of the hub 27 is to be transmitted. A pressing piece 33 is connected to the sliding piece 30 through a roller bearing 32 and is in contact at the tip with a pressing plate 34. A pressed plate 36 of the third centrifugal clutch 19 is loosely fitted to the intermediate shaft 18. The above mentioned pressing plate 34 is pressed by springs against this pressed plate 36 and is loosely fitted to the intermediate shaft 18. A hub 37 of the third centrifugal clutch 19 is slidably connected through a spline 38 to the intermediate shaft 18 which is a rotary shaft to which the rotation of the hub 37 is to be transmitted. The third centrifugal clutch 19 pushes the hub 37 leftward in the drawing with the radially outward movement of the centrifugal balls 39 and presses friction plates 40 and 41 against the pressed plate 36 to transmit the rotation from a housing 42 to the hub 37. The housing 42 serves both second centrifugal clutch 17 and third centrifugal clutch 19. A spring 43 is to adjust the pressure.

In this embodiment, a sleeve 45 is secured to the intermediate shaft 18 by means of a key 44 or the like, the above mentioned pressed plate 36 and pressing plate 34 are loosely fitted to this sleeve 45 and the hub 37 is spline-engaged by the spline 38. Therefore, in this case, the pressed plate 36 and pressing plate 34 are substantially loosely fitted to the intermediate shaft 18 and the hub 37 is substantially spline-engaged with the intermediate shaft 18.

The operation of the rotational speed controlling device according to the present invention and formed as mentioned above, shall be explained in the following.

While running by using the second centrifugal clutch 17, if the accelerator is quickly opened to be in a quickly accelerated state, the number of revolutions of the engine will not rise, before it, the driving torque will quickly rise. With this rise, the sliding piece 30 to which the transmitting torque will be applied will be moved rightward in the drawing by the helical spline 31, will push the pressing plate 34 through the pressing piece 33 and will press the hub 37 against the centrifugal ball 39. Therefore, the centrifugal balls will be prevented from moving radially outward, the connection of the third centrifugal clutch 19 will be delayed, therefore the second centrifugal clutch 17 will remain engaged and the vehicle will be able to be sufficiently accelerated. When it is well accelerated, the centrifugal force of the centrifugal balls 39 will gradually become stronger than the driving torque and as a result, the clutch will be changed to the third centrifugal clutch.

As explained above, in the rotational speed controlling device according to the present invention, the sliding piece 30 is slidably connected through the dogteeth 29 to the hub 27 of the second centrifugal clutch, this sliding piece 30 is connected through the helical spline 31 to the second pinion shaft 28 to which the rotation of the hub 17 is to be transmitted, the hub 37 of the third centrifugal clutch 19 is slidably connected through the spline 38 to the rotary shaft 18 to which the rotation of this hub 37 is to be transmitted and the hub 37 of the above mentioned third centrifugal clutch is pressed to slide by the pressing piece 33 provided on the above mentioned sliding piece 30 in response to the driving torque so as to vary the number of rotations connected by the third centrifugal clutch.

Therefore, in the automatic three-speed transmission provided with the present device, at the time of an ordinary slow acceleration, the speed will be changed by the engagement of the respective clutches successively in the order of the first, second and third speeds but, at the time of a quick acceleration, the second speed will not be immediately changed to the third speed but the second speed state will be maintained for a while, the acceleration performance will be improved and then the speed will be changed to the third speed. Therefore, an acceleration performance which is excellent at the time of a quick acceleration can be obtained.

Such a mechanism as described in the following, can be further attached to the above mentioned device of the present invention.

Figure 2:
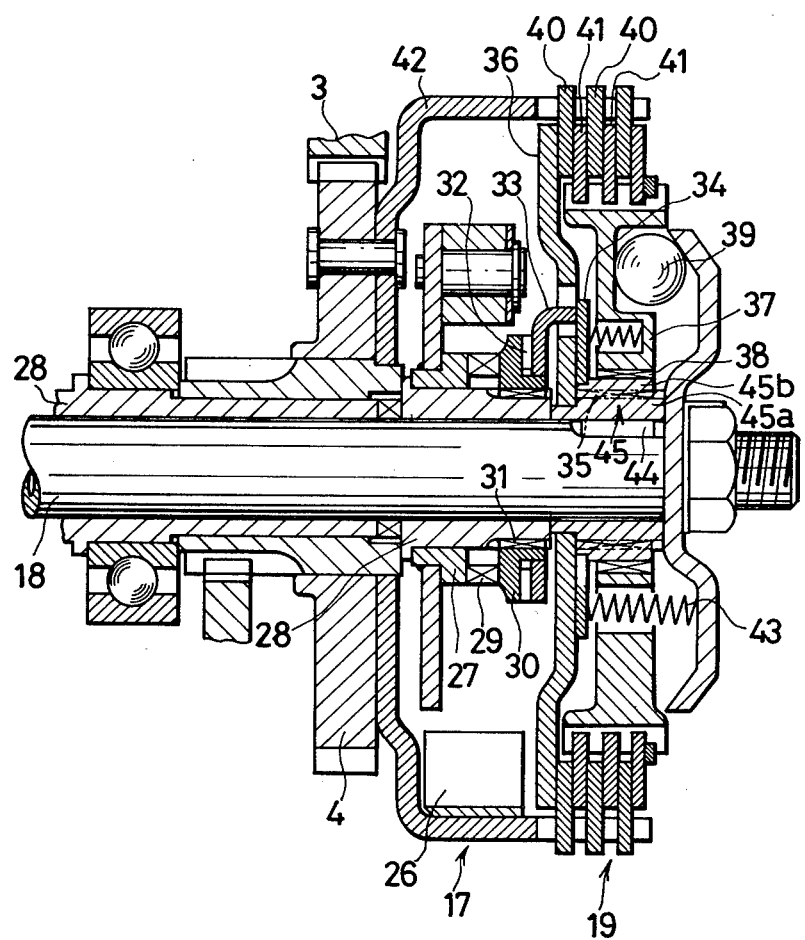
FIG. 2 is a schematic sectioned view showing the controlling device shown in FIG. 1.

That is to say, a sleeve 45 in FIG. 2 is divided into two parts of an inside sleeve 45a and outside sleeve 45b, both sleeves 45a and 45b are connected with each other through a helical spline 35 indicated by the two-point chain line.

With such formation, in case the engine torque is larger than the centrifugal force of the third centrifugal clutch, for example, in case a large engine torque is generated by a quick acceleration from the low torque third-speed running state, the outside sleeve 45b together with the pressing plate 34 will be moved rightward in the drawing by the helical spline 35, the hub 37 of the third centrifugal clutch will be moved also rightward and the centrifugal balls 39 will be forcibly moved radially inward. Therefore, the third centrifugal clutch 19 will be forcibly disengaged to automatically make a second-speed state. Therefore, at the time of a quick acceleration, a better acceleration performance will be obtained. Thus changing the third speed to the second speed is called kicking down. Needless to say, at the time of the third-speed running at a high rotation and torque, the above mentioned kicking down will not be made.

Another embodiment of the present invention shall be explained in the following with reference to FIG. 3.

The present rotational speed controlling device shown in FIGS. 1 and 2 is applied to the automatic transmission where the intermediate shaft 18 and output shaft 13 are provided in parallel with each other near the crank shaft 1 of the engine so as to transmit the changed rotation of the output shaft 13 to the rear wheel axle (not illustrated) in the rear through the sprocket 14 and chain or the like.

Figure 3:
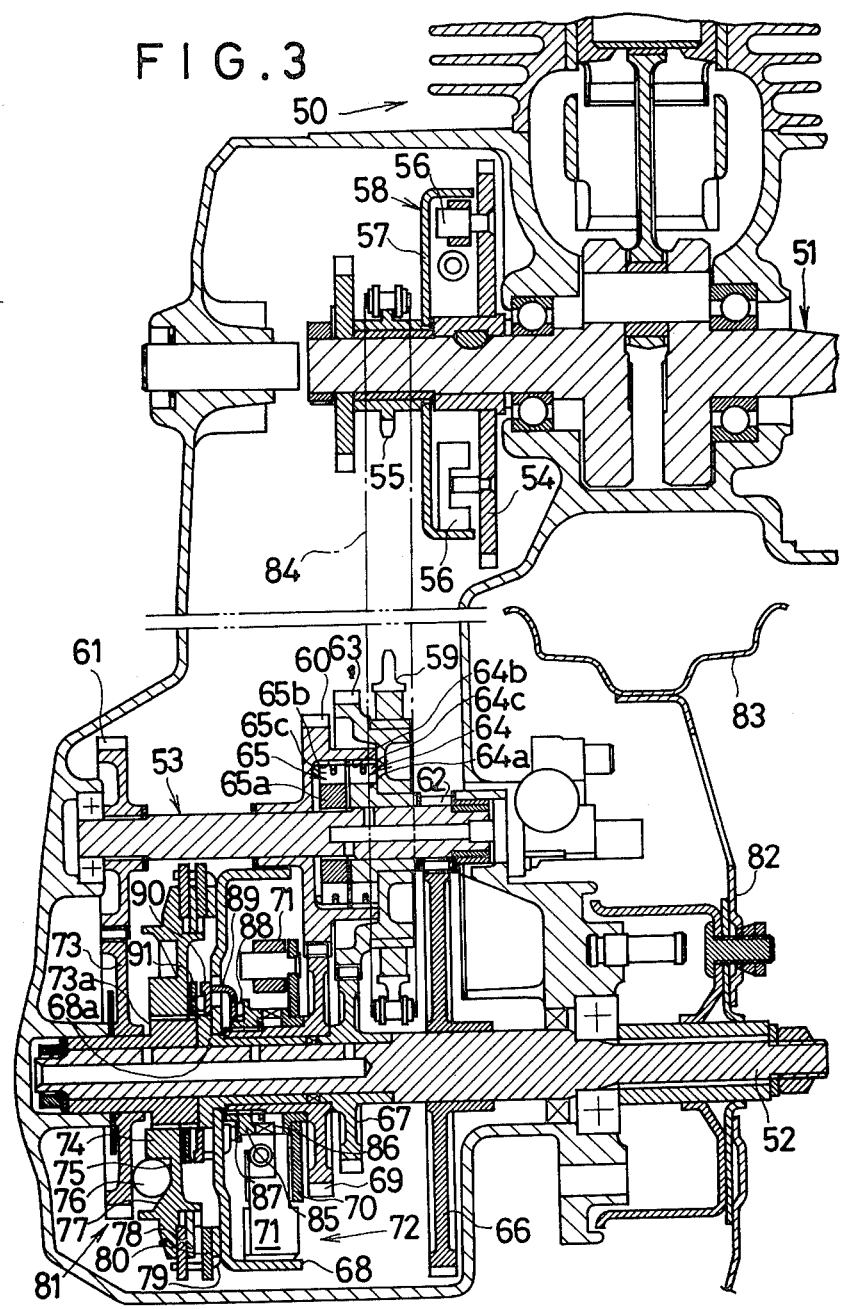
FIG. 3 is a schematic sectioned view of an automatic transmission provided with another embodiment of the rotational speed controlling device according to the present invention.

On the other hand, the speed controlling device shown in FIG. 3 is applied to an automatic transmission wherein the intermediate shaft is designed to be adjacent to the rear wheel axle, the output shaft is formed integrally with the rear wheel axle and the rotation of the crank shaft is transmitted to the intermediate shaft through a chain or the like so as to change the speed between the intermediate shaft and rear wheel axle.

In the drawing, 50 is an engine, 51 is a a crank shaft, 52 is rear wheel axle and 53 is an intermediate shaft provided in parallel with the rear wheel axle. A centrifugal plate 54 is secured and a sprocket 55 is loosely fitted to the crank shaft 51. Centrifugal weights 56 are rockably supported on the side of the centrifugal plate 54 and a clutch housing 57 of a channel-shaped cross-section is integrally fixed to the sprocket 55 so that a shoe expanding type low centrifugal clutch 58 may be formed of the centrifugal plate 54, the centrifugal weights 56 and clutch housing 57.

On the intermediate shaft 53, a sprocket 59 is loosely fitted in a position opposed to the above mentioned sprocket 55, a second speed driven gear 60 is loosely fitted on the left side of the sprocket, a third speed driven gear 61 is secured to the left and a final drive gear 62 is secured on the right of the sprocket 59. On the sprocket 59, a driving gear 63 is integrally formed on the left side and a one-way clutch inner member 64a which is one element of the one-way 64b is clutch 64 is fixed. By the way, a one-way clutch outer member which is the other element of the one-way clutch 64 formed integrally with the second speed driven gear 60. 64c is its clutch pole. 65a is a one-way clutch inner member which is one element of a one-way clutch 65 secured and set on the intermediate shaft. 65b is a one-way clutch outer member which is the other element of the one-way clutch 65 formed integrally with the second speed driven gear 60. 65c is its clutch pole.

On the rear wheel axle 52, a final driven gear 66 meshing with the above mentioned final driving gear 62 is secured and set, a driven gear 67 meshing with the above mentioned driving gear 63 is loosely fitted and further a boss 68a of a clutch housing 68 connected through a dogtooth clutch with this driven gear 67 is loosely fitted. By the way, 69 is a second speed driving gear meshing with the second speed driven gear 60. The boss of this gear 69 is loosely fitted to the outer peripheries of the boss of the driven gear 67 and boss 68a of the clutch housing. The boss of a centrifugal plate 70 is loosely fitted to the boss of the gear 69. Centrifugal weights 71 are rockably supported on this centrifugal plate 70. A sliding piece 85 is slidably connected through a dogteeth 86 to the boss of the centrifugal plate 70. The sliding piece 85 is connected to the boss of the second speed driving gear 69 through a helical spline 87. Further, a pressing piece 89 is connected through a roller bearing 88 to the sliding piece 85 and is in contact at the tip with a pressing piece 90. A shoe expanding type second centrifugal clutch 72 is formed of the above mentioned clutch housing 68, centrifugal plate 70 and centrifugal weights 71.

Further, a third speed driving gear 73 meshing with the third speed driven gear 61 is loosely fitted to the rear wheel axle. A sleeve hub 74 is axially slidably connected through a spline to the peripheral surface of the boss 73a of this driving gear 73. A plurality of recesses 75 are formed at regular intervals on the side surface of the sleeve hub 74. Centrifugal balls 76 are contained between the recesses 75 and the side surface of the third speed driving gear 73. A slope 77 is formed on the outer periphery of the recesses 75. Further, a friction plate 78 is provided on the right side surface of this sleeve hub 74 and is opposed to a friction plate 80 on the clutch housing 79 side formed integrally with the above mentioned clutch housing 68. Also, a second pressing plate 91 is arranged to the right of the above mentioned sleeve hub 74. This second pressing plate 91 is provided slidably on the boss 73a of the third driving gear. A roller bearing is arranged between the second pressing plate 91 and pressing plate 90.

By the way, a centrifugal ball type third centrifugal clutch 81 is formed of the above mentioned third speed driving gear 73, sleeve 74, centrifugal balls 76, friction plate 76, clutch housing 79 and friction plate 80. 82 is a disk of the rear wheel, 83 is a rim and 84 is a chain.

The operation of the above mentioned automatic transmission shall be explained in the following.

When the engine 50 starts and the rotating speed of the crank shaft 51 becomes constant, the centrifugal weights 56 will be expanded by the centrifugal force to contact the clutch housing 57 and the housing 57 and centrifugal plate 54 will be combined together. Therefore, the rotation of the crank shaft 51 will be transmitted to the intermediate shaft 53 through the centrifugal plate 54, clutch housing 57, sprocket 55, chain 84, sprocket 59, one-way clutch 64, second speed driven gear 60 and one-way clutch 65 and will be further transmitted to the rear wheel axle through the final driving gear 62 and final driven gear 66. By the way, in this state, the driving gear 63 will rotate together with the sprocket 59 and, with it, the driven gear 67 and clutch housings 68 and 79 will be rotated but, as the clutches 72 and 81 are not engaged, this rotation will not be transmitted to the other elements which will be idling. Further, the rotation of the second speed driven gear 60 rotating through the one-way clutch 64 from the sprocket 59 will be transmitted to the centrifugal plate 70 through the second speed driving gear 64, helical spline 87, sliding piece 85 and spline 86 but, as the rotating speed is not so high as to expand the centrifugal weights 71, the centrifugal plate 70 will be also idling.

When the rotation of the engine 50 rises from this state, the rotation transmitted to the centrifugal plate 70 through the crank shaft 51, sprocket 55, chain 84, sprocket 59, one-way clutch 64, second speed driven gear 60, second speed driving gear 69, helical spline 87, sliding piece 85 and spline 86 will rise and the centrifugal weights 71 will be expanded by the centrifugal force thereby to contact the clutch housing 68. Therefore, the rotation of the crank shaft 51 will be transmitted to the rear wheel axle 52 through the sprocket 55, chain 84, sprocket 59, driving gear 63, driven gear 67, clutch housing 68, centrifugal weights 71, centrifugal plate 70, spline 80, sliding piece 85, helical spline 87, second speed driving gear 69, second speed driven gear 60, one-way clutch 65, intermediate shaft 53, final driving gear 62 and final driven gear 66. By the way, in this state, the same as in the case of the above mentioned first speed, the clutch 81 will not be engaged. Further, as the second speed driven gear 60 is higher in the rotating speed than the sprocket 59 (driving gear 63), the one-way clutch 64 will be idling.

When the rotation of the engine 50 further rises, the sleeve hub 74 will be rotated at a higher speed through the intermediate shaft 53, third driven gear 61, third speed driving gear 73 and its boss 73a, the balls 76 will be moved radially outward of the recesses 75 and, with it, the sleeve hub 74 will be pushed and fed rightward to contact the friction plate 78 with the friction plate 80 on the clutch housing 79 side. Therefore, the rotation of the crank shaft 51 will be transmitted to the rear wheel shaft 52 through the sprocket 55, chain 84, sprocket 59, driving gear 63, driven gear 67, clutch housings 68 and 79, friction plates 80 and 78, sleeve hub 74, boss 73a, third speed driven gear 61, intermediate shaft 53, final driving gear 62 and final driven gear 66. By the way, in this state, the second centrifugal clutch 72 will be engaged but the rotating speed of the second speed driven gear 60 rotated through the centrifugal plate 70, sliding piece 85 and second speed driving gear 69 will be lower than the rotating speed of the intermediate shaft and therefore the one-way clutch 65 will be idling.

The above mentioned automatic transmission is also provided with the rotational speed controlling device according to the present invention wherein the sliding piece 85 is slidably connected through the spline 86 to the centrifugal plate 70 of the second centrifugal clutch 72, this sliding piece 85 is connected through the helical spline 87 to the boss of the second speed driving gear 69 and the sleeve hub 74 of the third centrifugal clutch 81 is slidably spline-connected to the rotary shaft to which the rotation of this hub 74 is to be transmitted (the boss 73a of the third speed driving gear 73) so that, in response to the driving torque, the above mentioned sliding piece 85 may be moved leftward in the drawing and the hub 74 of the above mentioned third centrifugal clutch may be slid through the pressing plates 90 and 91 by the pressing piece 89. Therefore, as described above, in this automatic transmission, too, in case a quick acceleration is made at the time of the second speed running, the second speed state will be maintained for a while until a sufficient acceleration is made and then will be changed to the third speed and, therefore, an excellent acceleration performance will be obtained. By the way, in this automatic transmission, the kick-down mechanism formed of the helical spline 35 shown in FIG. 2 is not provided but can be provided as required.

By the way, in this speed controlling device, the centrifugal plate 70 corresponds to the hub 27 in FIG. 2, the boss of the second speed driving gear 69 corresponds to the second pinion shaft 28 in FIG. 2 and the boss 73a of the third speed driving gear corresponds to the intermediate shaft 18 or sleeve 45 in FIG. 2.

Though not related with the speed controlling device of the present invention, the automatic transmission shown in FIG. 3 shall be briefly explained in the following.

In the general automatic transmission to be used for motor cycles or the like, as shown in FIG. 1, the intermediate shaft 18 and output shaft 13 are provided in parallel with each other near the crank shaft 1 of the engine so as to change the speed between both shafts 18 and 13 and transmit the rotation to the rear wheel axle in the rear. However, there have been disadvantages that, if the transmission is formed in this manner, the transmission will have to be provided near the engine, therefore the engine part will be large, the space for setting the engine and transmission will have to be secured with difficulty and it will be difficult to compact the transmission in order to obtain a large speed change ratio.

The automatic transmission shown in FIG. 3 is so formed as to eliminate such disadvantages. Therein, the output shaft is formed integrally with the rear wheel axle 52 so as to be omitted and the intermediate shaft 53 is arranged near this rear wheel axle 52 so that the rotation of the crank shaft 51 may be transmitted to the intermediate shaft 53 through the chain 84 and the speed may be changed between this intermediate shaft 53 and rear wheel axle 52, that is, on the rear wheel axle 52. Therefore, as the output shaft is omitted, the transmission itself will be compact and, as the main part of the transmission is arranged near the rear wheel axle 52, it will not be necessary to worry about securing the engine part setting space and it will be possible to obtain a large speed change ratio.

By the way, generally, if the second centrifugal clutch 72 is arranged on the rear wheel axle 52 to change the speed on the rear wheel axle 52, as the rotation of the rear wheel axle 52 is low, the design relating to this clutch 72 will be difficult. However, in such formation as is shown in FIG. 3, the gear ratio of the driving gear 63 to the driven gear 67 can be made large and therefore this difficulty can be avoided.

By the way, the transmission shown in FIG. 3 is a three-speed automatic transmission but can be easily formed as a two-speed transmission by omitting the third centrifugal clutch 81, third speed driving gear 73 and third speed driven gear 61.

We claim:

1. A rotational speed controlling device for an automatic transmission for changing speeds by automatically changing over between a plurality of centrifugal clutches in response to the number of revolutions of an engine connected to the transmission, characterized in that a sliding piece is connected to a rotary shaft to which the rotation of a low speed side centrifugal clutch is to be transmitted so as to be able to transmit rotations and to be slidable in the axial direction in response to a driving torque of the engine so that the number of engaging rotations of a high speed side centrifugal clutch may be varied by the sliding of the above mentioned sliding piece caused in response to the driving torque, and in that the above mentioned sliding piece is connected through dogteeth to a hub of the above mentioned low speed side centrifugal clutch, said sliding piece being connected through a helical spline to the rotary shaft to which the rotation of the hub of the above mentioned low speed side centrifugal clutch is to be transmitted, the above mentioned high speed side centrifugal clutch being formed as a centrifugal ball type clutch, a further hub of said high speed side centrifugal clutch being connected through a spline to a further rotary shaft to which the rotation of said further hub is to be transmitted so that the further hub of the above mentioned high speed side centrifugal clutch may be pressed and slid by the sliding of the above mentioned sliding piece.

2. A rotational speed controlling device for an automatic transmission for changing speeds by automatically changing over between a plurality of centrifugal clutches in response to the number of revolutions of an engine connected to the transmission, characterized in that a sliding piece is connected to a rotary shaft to which the rotation of a low speed side centrifugal clutch is to be transmitted so as to be able to transmit rotations and to be slidable in the axial direction in response to a driving torque of the engine so that the number of engaging rotations of a high speed side centrifugal clutch may be varied by the sliding of the above mentioned sliding piece caused in response to the driving torque, and in that a hub of the above-mentioned high speed side centrifugal clutch is slidably connected through a spline to a sleeve, said sleeve being divided into an inside sleeve and outside sleeve and both sleeves being connected with each other through a helical spline so that, when the driving torque of the engine overcomes the centrifugal force of the high speed side centrifugal clutch, said high speed side centrifugal clutch will be forcibly disengaged and will be automatically changed over to the low speed side centrifugal clutch.

3. An automatic transmission with a rotational speed controlling device, comprising:
  an input shaft for receiving a torque from an engine;
  an output shaft for rotation by said input shaft; connected to said input shaft over at least two pathways;
  a low speed centrifugal clutch in one of said pathways connected between said input shaft for transmitting low speed rotation from said input to said output shaft;
  a high speed centrifugal clutch in another of said pathways connected between said input and output shafts for transmitting high speed rotation from said input to said output shaft;
  a rotary shaft connected to said low speed centrifugal clutch for rotation therewith;

a sliding piece slidably engaged with said rotary shaft and engageable with said high speed centrifugal clutch for de-activating said high speed centrifugal clutch; and spline means connected between said slide piece and said rotary shaft for engaging said slide piece with said high speed centrifugal clutch for deactivating said high speed centrifugal clutch when an increased torque is applied to said input shaft so that the increased torque is applied through said low speed centrifugal clutch to said output shaft, and said spline means comprising a helical spline connected between said slide piece and said rotary shaft;

said high speed centrifugal clutch comprising a centrifugal ball-type clutch having a hub connected through a spline to said rotary shaft, said slide piece engageable with said hub for deactivating said high speed centrifugal clutch;

said high-speed centrifugal clutch comprising an inside sleeve and an outside sleeve connected to each other through a further helical spline so that with increased torque applied to said input shaft, said high speed centrifugal clutch is forcibly disengaged for transmitting the torque over said low speed centrifugal clutch to said output shaft.

* * * * *